(12) United States Patent
Bulmer

(10) Patent No.: US 7,894,783 B2
(45) Date of Patent: Feb. 22, 2011

(54) METHOD OF POWER MANAGEMENT IN A DATA REPLICATION PROCESS DEPLOYED IN A WIRELESS DEVICE

(75) Inventor: Russell Kennett Bulmer, London (GB)

(73) Assignee: Critical Path Data Centre Limited, Cheshire (GB)

( * ) Notice: Subject to any disclaimer, the term of this patent is extended or adjusted under 35 U.S.C. 154(b) by 625 days.

(21) Appl. No.: 11/914,958

(22) PCT Filed: May 19, 2006

(86) PCT No.: PCT/GB2006/001852
§ 371 (c)(1),
(2), (4) Date: Nov. 20, 2007

(87) PCT Pub. No.: WO2006/125961
PCT Pub. Date: Nov. 30, 2006

(65) Prior Publication Data
US 2009/0275354 A1 Nov. 5, 2009

(30) Foreign Application Priority Data
May 24, 2005 (GB) .................. 0510549.9

(51) Int. Cl.
*H04B 1/04* (2006.01)
*H04K 3/00* (2006.01)

(52) U.S. Cl. ............... 455/127.5; 455/343.5; 455/574; 340/7.37

(58) Field of Classification Search ............. 455/127.5, 455/343.1, 343.5, 404.1, 572–574; 340/7.37
See application file for complete search history.

(56) References Cited

U.S. PATENT DOCUMENTS

| 4,667,289 A | 5/1987 | Yoshida et al. |
| 6,697,953 B1 | 2/2004 | Collins |
| 6,721,580 B1 * | 4/2004 | Moon ..................... 455/574 |
| 2003/0229813 A1 | 12/2003 | Shiiyama |
| 2004/0204181 A1 * | 10/2004 | Cromer et al. ........... 455/574 |
| 2005/0021571 A1 | 1/2005 | East |

FOREIGN PATENT DOCUMENTS

GB 2 384 589 A 7/2003

* cited by examiner

*Primary Examiner*—Lee Nguyen
(74) *Attorney, Agent, or Firm*—Saul Ewing LLP

(57) ABSTRACT

A wireless information device automatically replicates data held on the device to a remote server over a wireless network. An application on the device
 (a) automatically determines the battery level of the device;
 (b) prevents sending data over the wireless network if the battery level is below a first threshold.

20 Claims, 1 Drawing Sheet

Figure 1

METHOD OF POWER MANAGEMENT IN A DATA REPLICATION PROCESS DEPLOYED IN A WIRELESS DEVICE

CROSS REFERENCE TO RELATED APPLICATIONS

This application claims the priority of PCT/GB2006/001852 filed on May 19, 2006 and GB 0510549.9 filed on May 24 2005, the entire contents of which are hereby incorporated in total by reference.

BACKGROUND OF THE INVENTION

1. Field of the Invention

This invention relates to a method of power management in a data replication process deployed in a wireless information device. The term 'wireless information device' used in this patent specification should be expansively construed to cover any kind of device with one or two way wireless information capabilities and includes without limitation radio telephones, smart phones, communicators, personal computers, computers and application specific devices. It includes devices able to communicate in any manner over any kind of network, such as GSM or UMTS, CDMA and WCDMA mobile radio, Bluetooth, IrDA etc.

2. Description of the Prior Art

Data replication processes are deployed in wireless information devices to replicate information held on a wireless information device onto a remote server; replication from the server to the wireless device is also possible. Typical applications that use data replication are for synchronisation of files (e.g. address/contacts lists; diary contents) and also messaging. Another increasingly popular application is the uploading of photographs from the wireless device to a photo sharing site; the Shozu™ service from Cognima is one such application.

In the Shozu service, when an object within the photo database on the phone is changed, the change is queued for transfer to the remote server over a wireless link (typically the cellular wireless network). Normally, that object is transferred to the server as soon as a data connection is available.

Details of the replication protocol used in Shozu can be found in GB2384589B or US 2005-0021571, the contents of which are incorporated by reference. Appendix 1 also includes details of this replication system. One disadvantage of this approach is that it can rapidly deplete the power reserves of the wireless information device.

There are several power management strategies commonly used in wireless information devices to preserve battery life, including causing the device to shut down (i.e. enter a low power consumption state) when not in use, referred to as going into a 'sleep' mode, and by causing devices such as cellular telephones to camp, i.e., cycle on and off many times a minute, switching on only very briefly to determine if a call or message is being transmitted to the cellular telephone.

Certain types of electronic data storage, for example random access memories or RAM, typically require that the device retain some electrical charge in its batteries to preserve stored data—if the battery is completely discharged, the data will be lost. To avoid loss of data, it is therefore common for such electronic devices to shut down completely before a certain minimum safe battery charge is reached. Alternatively, some devices have a secondary battery to protect memory—though this device also shuts down at a minimum battery charge. While such shut-down arrangements are an effective way of protecting memory, they are extremely irritating to users, since they necessarily inhibit access to the functions of the device; premature shut down, i.e., a shut down before a critical battery energy level is reached, is yet more irritating and therefore undesirable.

SUMMARY OF THE INVENTION

In a method of power management in a data replication process deployed in a wireless information device, the device automatically sends predefined types of data held on the device to a remote server over a wireless network; the method comprises the steps of:
(a) automatically determining the battery level of the device;
(b) not sending data over the wireless network if the battery level is below a first threshold.

In an implementation, if the battery level is above a second threshold, then all data is sent. If the battery level is above the first threshold but below the second threshold, the that is automatically sent is data of a size that can be sent without consuming a predefined amount of power. The data that cannot be sent because doing so would consume in excess of the predefined amount of power, is queued for delivery when the device has sufficient battery power. The battery level can be monitored whilst data is being sent such that, if the battery level falls below the second threshold, then the device automatically ceases sending data. Effective power management techniques are hence provided that can work entirely automatically. The power management techniques can also operate entirely in background—i.e. the end-user is not necessarily made aware of when the device decides to not send data because the battery level is too low, nor when the device decides it can send data because the battery level is sufficient.

Generally, the first threshold is set at a level sufficient to preserve sufficient battery power for at least emergency calls.

Another feature is that either or both of the thresholds can be set remotely, e.g. from the remote server. Further, the data size can be set remotely. The threshold or data size can be set remotely for a given class of device and/or a given end-user.

The invention also covers a wireless information device programmed with an application that can perform the above defined methods.

BRIEF DESCRIPTION OF THE DRAWINGS

The present invention will be described with reference to the accompanying drawing, in which.

DETAILED DESCRIPTION

In one implementation from Cognima, a data replication framework transmits data updates to and from a mobile phone in the background. This implementation of the invention then ensures that such data transfers do not completely drain the phone battery, instead leaving sufficient power available for emergency calls and other essential functions.

Figure 1:
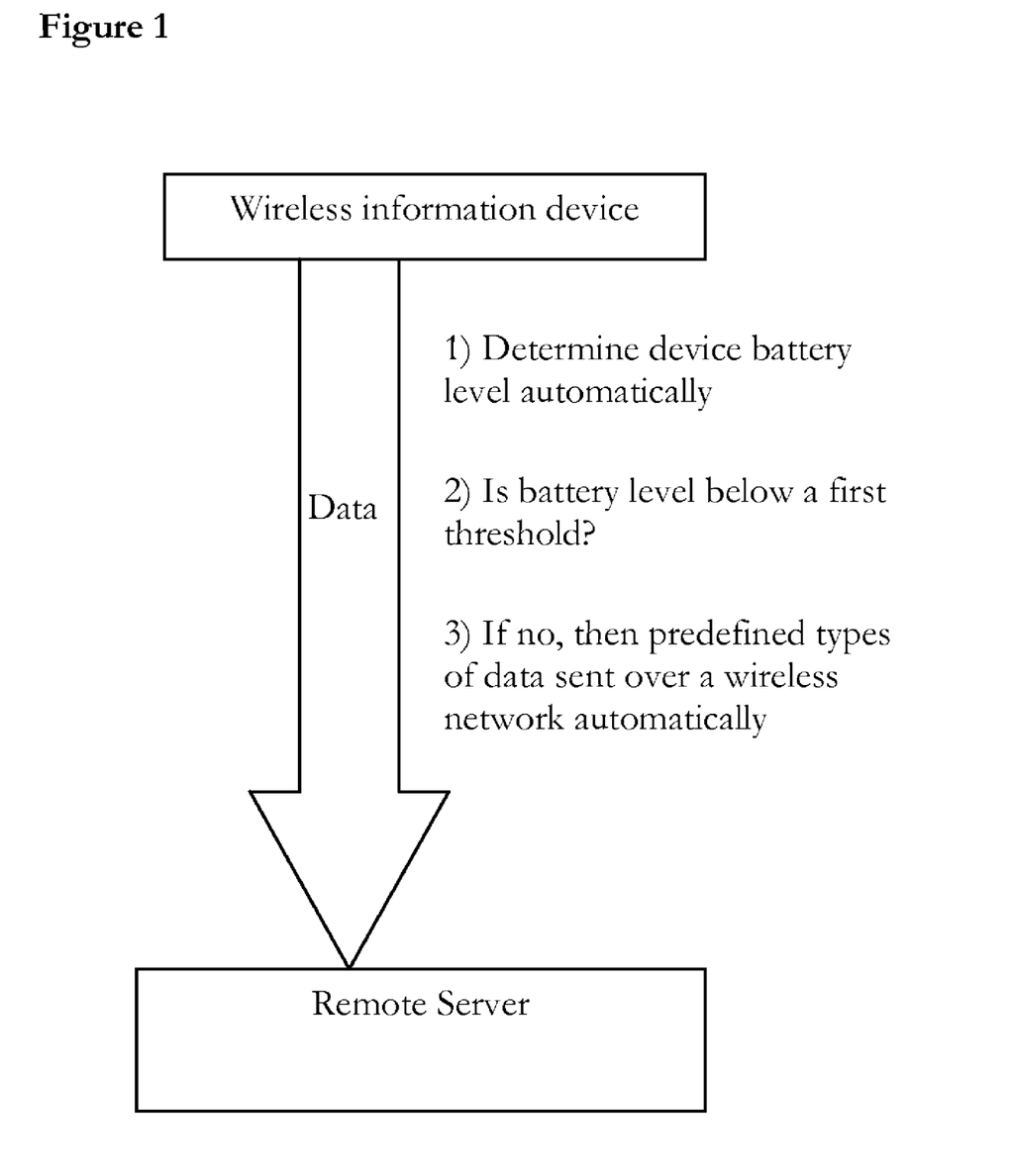
FIG. 1 represents a method of power management in a data replication process deployed in a wireless information device, in which the device automatically sends predefined types of data held on the device to a remote server over a wireless network.

Before starting the data transfer process, an application in the phone checks the battery level on the handset. If the battery level is below a certain critical threshold, the phone application will hold off all data transfer until the phone battery has been recharged. If the battery level is below an intermediate threshold, the phone application will initiate the transfer of small data objects that will not consume a lot of power, but will delay the transfer of larger objects that would drain the battery, queuing them for delivery when the phone battery has sufficient power. FIG. 1 schematically represents this process.

The end-user benefit is that the application will preserve sufficient battery power for emergency calls and other essential functions, without requiring the user to manually pause and resume data transfers. When the battery is recharged, the queued data is automatically transferred without any user interaction being required.

| Definitions | |
| --- | --- |
| Critical Threshold | The battery power level below which no data transfers should be made. This is typically 10% of the full charge level. |
| Safety Threshold | The battery power level below which only small amounts of data should be transferred. This is typically 30% of the full charge level. |
| Data Limit | The maximum amount of data that should be transferred when the battery power level is below the Safety Threshold. This is typically 64 KB. |
| High Power State | A device with remaining battery power above the Safety Threshold is in this state |
| Charging State | A device that is charging its battery is in this state |
| Critical State | A device with an amount of remaining battery power below the Critical Threshold is in this state |
| Safety State | A device with remaining battery power between the Critical Threshold and the Safety Threshold is in this state |
| Data Transfer Mode | The phone application is in this mode when it is transferring data |
| Power Waiting Mode | The phone application is in this mode when it is not making a data connection due to low battery power |

When the phone application identifies that a connection to the server is required, it first determines the State of the phone from the remaining battery power. It also calculates the expected data transfer size.

Based on the State, and the data transfer size, different actions are taken:

| High Power State | The application allows connection and data transfers to take place |
| --- | --- |
| Charging State | The application allows connection and data transfers to take place |
| Critical State | The application goes into Power Waiting Mode, and does not make a connection or allow data transfers to take place |
| Safety State | If the amount of data to be transferred is less than the Data Limit, connection and data transfers take place. Otherwise no connection or data transfers take place, and the application goes into Power Waiting Mode. |

While the application is in Power Waiting mode the device might start charging. In this event, the application exits Power Waiting Mode. It then connects and data transfers take place.

While the application is in Data Transfer Mode, the phone may change Power State. When this occurs, the application re-evaluates, based on the above rules, whether it should be transferring data. If it should not be transferring data, it terminates the connection, stops data transfers, and enters Power Waiting Mode.

The battery power thresholds and the data limit can themselves be Cognima objects. This means that they can be changed dynamically from the Cognima server. For example, the default thresholds can be changed for a given class of phone or a given user, and the new values are then transferred to the phone during the next data connection.

EXAMPLE

An application based on the Cognima data replication framework needs to transfer some data. It checks the power and finds it below the Critical Threshold, so no connection is made. Later, the device is plugged into a power outlet, and enters the Charging State. Because of this, the application connects to the server and transfers data.

During the data transfer process, the phone is unplugged, and goes back to Critical State. Because of this, the application aborts the connection, and stops transferring data. The remaining data to be transferred is queued for automatic delivery when the battery power is restored.

Appendix 1

This Appendix 1 describes the Cognima data replication technology that directly addresses the need for Mobile Service Providers (MSPs) and Network Operators to increase consumer adoption of data services, encourage greater loyalty from their valuable customers, and differentiate their services from the competition. Cognima's data replication solution addresses these issues by:

Increasing adoption by making data services compelling and effortless to use.

Establishing a high barrier to churn by securely backing up subscribers' personal data on servers controlled by those subscribers' MSP.

Enabling the MSP to create differentiated services by controlling the customer experience.

1. Overview of uses for the Cognima Data Replication Framework

Cognima's data replication framework enables a Mobile Service Provider to build compelling services for consumer markets. The MSP hosts a Cogniva Server at its data centre. The server comprises an Oracle database plus Cognima's multi-threaded Java communications server, hosted on a standards-based J2EE application server and carrier-grade Unix hardware. Section 4 and later sections describe the technical implementation in detail.

The Cognima framework replicates data entered in a mobile phone automatically (without any user intervention) to other phones via the Cognima Server. Similarly, data from external systems connected to the Cognima Server is automatically kept up-to-date on mobile phones.

Mobile subscribers using Cognima-enabled applications experience an always-available, instant connection to their personal information and friends.

Personal information can include the subscriber's address book, messages, bank account details, stock prices, pizza orders, calendar, current traffic on a route to work, or any other personalised content. The data is always kept securely backed-up on the Cognima Server and automatically replicated on all relevant client devices.

Always-available means that the personal information is accessible on whichever device or handset the subscriber is carrying, whether currently connected to the network or not since the user can always access personal information stored locally on the device). Users can also edit and manage their personal data directly on the server via a web interface—the Virtual Phone.

Instant means that subscribers do not have to wait for data to download from a server; the latest information is on their handsets even before they know they need it since that data is automatically sent to the handset (e.g. polling by the handset may occur; this can be regular periodic—such as every 30 minutes or at pre-defined times (4pm, 5pm etc). Pushing to the handset may also occur).

Subscribers can share their data across multiple devices and with their friends since the Cognima Server can replicate this data to any defined device or defined individual.

1.1 Example Cognima Applications

| Customer | Need | Cognima Application |
| --- | --- | --- |
| Sarah | Sarah's phone has been stolen, including some important contact numbers and messages for which she has made no manual back-up copy. | Whenever Sarah enters data in her phone, Cognima automatically backs it up on a central server at the MSP's data centre. Sarah can buy a new mobile phone, and retrieve all her contacts and messages instantly from the central server, as long as she remains with the same MSP. She can also delete her data from the stolen phone via the MSP's portal. |
| Jill | Jill is out shopping. Before making an expensive purchase, she needs to know if her salary has been paid into her bank account. However, she is in the basement of a department store, and has no network coverage. | Cognima keeps Jill's personalised content (including her bank account details) up-to-date automatically on her mobile phone by periodically (or at a predefined time or even immediately a change occurs) sending any changed data to Jill's mobile. The latest data is there on Jill's phone even before she knows she needs it. She can access it instantly, even if there is no network coverage. |
| Matthew | Matthew likes to keep his friends informed about his current availability and 'mood'. He also likes to see what his friends are up to. He's mainly interested in keeping track of what's happening in his social group, and he wants to do this at a glance, without having to go 'on-line' or send lots of expensive messages. | Cognima shares Matthew's presence profile with his friends. When he changes his profile (e.g. selects an icon to indicate he's feeling sociable) the icon updates automatically in Matthew's address book entry on his friends' phones. Matthew can see presence information for all his friends at a glance on his own phone. He can even ask his phone to alert him when a friend is feeling sociable or bored, so that he can immediately call. |
| Laura | Laura has two mobile phones - one she uses at work, and a fashion-phone she takes out in the evenings. She wants to keep the same address book on both devices, but she hates entering data twice, and she's never figured out how to use the sync software that came with her phone. Swapping the SIM card over is cumbersome, and leaves behind data in the phone memory. | Cognima automatically keeps all the data in Laura's phones in step. Whenever she edits data on one handset, it is immediately (or periodically or at a predefined time) replicated onto the Cognima server which then updates her other phone as well. She never has to remember to press a 'sync button' - it just happens. Jill even shares some of the contacts in her phone with her husband, Geoff. When Geoff enters his mother's new mobile number, it is automatically updated in Jill's phones as well. |
| Juha | Juha also has two mobile devices - a phone and a wireless-enabled PDA. He needs to read and reply to e-mail and SMS messages on both devices, but he gets confused and frustrated, and loses productivity, when his Inbox gets out of sync. | With Cognima, SMS, e-mail and other types of messages can be read and sent from any device, and also using a 'Virtual Phone' web interface. Messages are received on all devices used by the subscriber, and sent messages appear in the Outbox on all devices. Any message read on one device is instantly marked as read on all other devices. |

-continued

| Customer Need | Cognima Application |
|---|---|
| | Messages deleted from a mobile phone can be stored and retrieved via the Cognima Server. |

2. Benefits to the Mobile Subscriber

Cognima provides an ideal framework for implementing mass-market consumer data services based on the following key benefits:

Friendliness: no user intervention is required. Subscribers never need to press a 'sync' or 'download' button to access their data. System configuration and secure data transfer are completely transparent to the end user.

Instant availability: the user is always able to interact instantly with local data (even when off-line), whilst any updates take place silently in the background. For example, users can read their personalised content whilst on an underground train. The user experience is separated from the data transport.

Affordability: The MSP can control when replication takes place, and the Quality of Service (QoS) delivered. However, because the user experience is separated from the data transport, lower QoS does not affect the user's perception of the service. Crucially, this allows the MSP to offer low-cost, subscription-based services with relatively poor QoS without sacrificing user experience— e.g. data replication can happen overnight for non-urgent data services such as bank statements, yet still be satisfactory to users. Overnight data replication uses otherwise underused bandwidth and is hence far cheaper than peak time data replication. Urgent data replication (e.g. presence information) can happen at any time on a periodic or (optionally) continuous (push) basis and attract a higher charging rate. Furthermore, efficient use of phone memory & processor power allows Cognima client software to be cost-effectively installed in even the cheapest mass-market phones.

3. Benefits to the Mobile Service Provider

Cognima presents a MSP with a means to generate new data revenues, reduce churn, and to differentiate its services from those of its competitors.

3.1 Increased Usage of Existing Mobile Services

Cognima increases usage of existing mobile services:

Messaging and content-based services become much more convenient and immediate, and will therefore be used more.

The enhanced immediacy of presence information increases the use of chat and Instant Messaging, and an alert when free capability will boost voice calls.

Effortless management of multiple devices allows users to carry an appropriate phone on any occasion, and therefore make more calls and send more messages.

3.2 Compelling New Services

Cognima enables rapid introduction of compelling and affordable new mobile data services.

Cognima delivers a compelling user experience for new services in low-end phones using only spare network capacity. This is affordable and scalable for the network operator, allowing the MSP to offer understandable and predictable pricing for mass-market subscribers.

Most of the application development for new Cognima services takes place on the server side, allowing the MSP to bring new services to market quickly.

Cognima's client software can be installed as a flash memory upgrade, endowing today's mass-market handsets with smart-phone-like capabilities. New software applications can be downloaded over the air to existing Cognima-enabled handsets, allowing MSPs to roll out new data services without waiting for new devices to support them.

Third party application developers can leverage the MSP's Cognima infrastructure to develop new applications for the MSP's network.

3.3 Churn Reduction

Cognima services act as a significant barrier to churn. For example, a subscriber who stores their personal information securely at their MSP's Cognima Server can buy a new phone and immediately retrieve all personal information to their new device. All this personal information may be lost if they decide to take out a subscription with a different service provider.

3.4 Differentiation

Today, subscribers have the same basic experience of using mobile data services on all networks. For example, the experience of using WAP services is defined by the WAP protocols, the browser in the phone, and the content accessed. Many MSPs have realised that they must differentiate themselves by giving their subscribers a unique user experience, but are hindered from doing so by severe constraints to customising the services in mobile handsets.

Cognima gives MSPs the ability to implement services on the handset, and thereby to regain control of their subscribers' user experience. Most importantly, Cognima allows this without sacrificing interoperability; support for industry standards is achieved through straightforward integration with the Cognima Server. The net result is that the MSP's position in the value chain is strengthened versus the powerful brands of handset manufacturers and content providers.

4. Cognima Data Replication Framework Functional Design 4.1 Introduction

This and subsequent sections of the Detailed Description are intended to describe how the Cognima data replication system actually works. It covers the behaviour of client devices, the Cognima Server and the web client, without going into details of specific hardware, programming language, software class design or environment. It does describe the basic data structures and algorithms used.

| Terms | |
|---|---|
| Client device | A phone, PDA or other machine running the Cognima client software. |
| Cognima server | A server accessible by client devices which runs the Cognima server software to replicate data. |

-continued

| Terms | |
|---|---|
| Replication | The process of copying data from a client device up to the Cognima Server and then down to other client devices belonging to the same user. |
| User | A human being who owns and uses at least one Cognima client device |
| User data | The set of information (contacts, messages, ringtones, pictures etc) that a user might want to store and manipulate on a client device. |

4.2 Purpose

The objectives of the Cognima software are:

To allow a user instant access to view and modify an 'up to date' copy of their data on multiple handheld devices capable of wireless data connectivity.

To allow a user to view and modify the same data using a conventional web browser.

To effortlessly provide secure backup of a user's data.

To give a user powerful data functionality on a cheap handset by displacing complicated and expensive processing to a server.

4.3 Highest Level Description

Client devices hold a copy of the user's data in a database on the client device. The user can access this data whether or not he has a network connection and therefore always has instant access. When a user changes the data on his device, the changes are copied to a Change-Log. The client device connects periodically to a Cognima Server on the wireless network, to send up the changes from the Change-Log and receive new data. This separates the act of changing data from the need to connect to the network (i.e. push is not continuous in a preferred implementation). The Cognima Server updates its own database with data changes received from the client device, and populates Change-Logs for any other devices the user owns. When these devices next connect, they will receive the changes and thus the devices are kept in sync, each with a copy of the same data.

The Cognima Server contains a web server which allows the user to examine directly using a web browser the copy of the data held in the Cognima Server database, and make changes to it as he would on a client device. The Cognima Server also acts as a gateway for the user to communicate with other servers on the network/internet. For example, the client device can effectively ask the Cognima Server to send a message as an SMS or an email or a fax by setting a few flags in a message object and the Cognima Server contains the functionality to communicate with email servers, SMS servers and fax machines. This can be extended to servers holding ringtones, banking details, games etc. It is easier and cheaper to build the software on the Cognima Server to talk to these other servers, than it would be to build the software on the client device.

5. Lower Level Concepts 5.1 Data Structures 5.1.1 Ids

Cognima user data is described using the terminology of object databases: classes and objects. Unfortunately, there is room for confusion with similarly named OO programming concepts and care therefore needs to be taken.

All users in a Cognima network are assigned a user id. This id is unique to the network—i.e. provided by a given network operator. All users have a Cognima address which is a combination of their user id and Cognima Server URL. This is unique in the world. Each device which belongs to a user is assigned a device id. The device id is unique to the user. This is only 8 bits so a user can have a maximum of 253 devices (id 254 is reserved for the web, id 255 is spare, id 0 is invalid). All user data is classified into classes (contacts class, messages class, bank transactions class etc) and the classes are assigned a class id which is unique in the world. Class id '12' refers to a contact, for example.

An instance of a class is an object, which is assigned an object id unique to the user, e.g. a contacts class object might be the contact for "John Smith". The object id is generated by concatenating the device id of the device which created the object with a monotonic increasing count which increases over the life of the device. So each device can create a maximum of 16777215 objects (if we encountered this limit we could reset the device id). Classes are defined by the properties which constitute them. A class is essentially an array of properties. Each property in the class has a property id which is unique to the class (and is actually just the array position of the property in the property array, starting from zero).

5.1.2 Creating Objects

An object is created on a device. It is assigned an object id and saved to the device database. A copy is also saved into a Change-Log. When the device next connects to the Cognima Server the entry in the Change-Log is sent up. The Cognima Server saves the object to its database (recording the system time), does any class specific processing that may be required (such as generating and sending an email) and adds entries to Change-Logs for any other devices that the user may own which have declared interest in the class. (The entries should be for the correct version of the class on the device).

An object may also be created on the web portal. The object id is generated (using device id of 254 as described above) and processed identically to the device. There is no Change-Log for the web portal, it gets selections directly from the Cognima Server database.

An object may also be created by a server application (e.g. a messaging module might receive an email from which it creates a message object). The object id is generated (using device id of 254 as described above) and processed identically to the device.

5.1.3 Updating Objects

One or more properties of an existing object are modified on a device. The changes are saved to the device database. Each changed property is used to generate an entry in the device Change-Log. These are sent up to the Cognima Server.

If the time of the update is later than the 'last changed' time for the property in the Cognima Server database then the Cognima Server saves the changes to its database (recording the new 'last changed' time for the property), does any required class specific processing and adds entries to Change-Logs for other devices which belong to the user, have declared the class and have a version of the class which contains the property. The update is also placed on the Change-Log for the device that originated the change. This may seem strange but is required to cope with the following scenario:

A user has 2 devices A and B. He updates property 7 on A offline at 5 pm and updates it on B offline at 6 pm. He connects to the network with A first. The value of 7 on A gets put in the Change-Log to be sent to B. Later B connects. Its value of 7 is sore recent so the value of 7 on B is sent to A, but B gets A's value. Replicating the value of 7 back to B fixes this.

If an update is received by the Cognima Server for an object which is marked as deleted and the update is later than the deletion, then this is interpreted as an un-deletion. The object is undeleted, updated and then a refresh of the object in placed on the Change-Logs for all appropriate devices. Updates from the web portal or server applications work in the same way.

5.1.4 Deleting Objects

An object is deleted on the device. It is removed from the device database and an entry is put on the Change-Log listing the class id and object id. The entry is sent up to the Cognima Server.

If the time of the deletion is later than the last updated time of the object, then the Cognima Server marks the object as deleted in its database, does any class specific processing and adds the entry to other devices that belong to the user and have declared the class.

If the time of deletion is earlier than the last updated time then this indicates that the deletion is invalid and a refresh of the object is put on the Change-Log for the device which originated the deletion.

The deleted object is viewable in the web portal a manner that makes its deleted status clear. The user can select the object for un-deletion. The deletion mark is removed from the object in the Cognima Server database and entries to refresh the object are placed on the Change-Logs for all devices that belong to the user and have declared the class.

5.1.5 Property Types

Each property has a type. There are currently 9 permitted property types:

| Type name | Type value | Type description |
|---|---|---|
| KcogTypeRef | 0 | 4 byte object id of another object |
| KcogTypeInt | 1 | signed 4 byte integer value |
| KcogTypeUInt | 2 | unsigned 4 byte integer value |
| KcogTypeFloat | 3 | signed 4 byte floating value |
| KcogTypeStr | 4 | a CogString (a 4 byte unsigned integer holding the number of characters in the string, followed by the character bytes) |
| KcogTypeTime | 5 | unsigned 4 byte integer value indicating the number of seconds since midnight 1st Jan 1990 |
| KcogTypeTypedStr | 6 | unsigned 4 byte integer value followed by a CogString |
| KcogTypeBlob | 7 | a stream of bytes preceded by a 4 byte unsigned integer which holds the number of bytes |
| KcogTypeArray | 8 | a blob structure which can hold an array of any kind of data |

A CogString is a character count followed by the characters. If the string is ASCII then the space taken up by the string will be (4+char count) bytes. If the string is Unicode then the space taken up will be (4+(char count*2)) bytes.

A CogTypedString is a CogString preceded by a type (4 byte unsigned integer).

The only use of a typed string so far is a Contact Point. The type identifies the type of contact point (e.g. email address, home phone) and the string holds the address (e.g. bob@xxx.yyy, 01233556677).

A CogBlob is a length in bytes followed by that number of bytes. It can be used to store any binary data.

A CogArray is passed around as a 4 byte unsigned integer 'type' followed by two blobs. The 'type' indicates the type of elements held in the array. The first blob is an index blob: it holds a sequence of offsets (4 byte unsigned integers) into the second blob. The second blob is the data blob which holds the elements of the array as a sequence of binary lumps. Elements can be extracted from the data blob by counting along the index blob to get the offset of the start of the element in the data blob. This is the stream structure of the CogArray as it is passed around. Inside a particular system it may appear as a conventional vector (i.e. already parsed).

The only implemented example of a CogArray is the MessageAddress. Each element of the MessageAddress is an AddressPair. An AddressPair is a contact id (object id of a contact object) followed by a Contact Point.

5.1.6 Smart Property Parameters

Some of the properties can be made "smart". This means they can be parameterised for a specific device to sculpt the data in the property for the characteristics of the device. In practice the parameters are two 4 byte unsigned integers, one is a smart type and the other is a max size. For example, the property which holds the body text of a message might be parameterised to smart type kCogPlainText and max size 100 on a cheap phone with limited memory, but parameterised to be smart type kCogRichText and max size 1000 on a PDA with more memory.

The parameters are stored by the Cognima Server when the application is added to the device. When new objects or updates for that class are placed in the Cognima Server Change-Log for that device they are processed according to the smart parameters. This might involve, for example, truncating text, converting Unicode text to narrow text or converting image formats.

It is important for data integrity that the object held in the Cognima Server database be a copy of the object as it was generated. Even if you see a cut down version on a device you can effectively manipulate the complete version on the Cognima Server.

5.1.7 Class Versions

We have the concept of a class version which is defined by a 4 byte unsigned integer. A new class version may add properties to the end of the old class, but it may not change or remove existing properties, or insert new properties between existing properties. This should allow interoperability between versions. Class definitions with different smart property parameters are not different versions.

5.2 Passing User Data Around

Cognima utilises the idea of class metadata to minimise the data that needs to be copied around between databases. Class metadata is essentially an array of property metadata. Property metadata is a property id, a property type, a smart type and a max size.

User data is transferred as a stream with no formatting information other than a class id. This stream is parsed by looking up the class metadata. So if a stream is received for class 6 and the class metadata for class 6 says that property 0 is a KcogTypeUInt and property 1 is a KcogTypeStr, then you know that the first 4 bytes of the stream should be interpreted as an unsigned integer, the next 4 bytes should be interpreted as an unsigned integer holding the number of characters n in the succeeding string, the next n (times 2 if Unicode) bytes hold the characters in the string etc.

Client devices declare to the Cognima Server the classes that they support. This enables the device to subsequently send up only raw user data (with a header containing class id, object id and a few other things) and hence minimises bandwidth requirements. This can be contrasted with, for example, XML reliant systems that are far more bandwidth hungry.

The client device class declarations also contain the smart property parameters so that the Cognima Server can sculpt the data for the device. It is worth emphasising that the meaning of a property is hard coded into an application. The class metadata states that property 2 in class 7 is a string with max length 30 characters. It is the code in the application that interprets property 2 in class 7 as the name of a football team.

5.2.1 Data Replication Issues in More Depth

Data is held in Objects that are created on client devices and the server these devices connect to (known as the Cognima Server). These objects and any changes made to them are replicated between the client devices and the Cognima Server. The design of the replication process allows:

- A set of objects to be defined that will be replicated so that the same set of objects will be held on a Cognima Server and all the client devices that are logged on to that server for a given user. New objects created on any device or the server will be replicated to all other devices. Changes in any property of an object will be replicated to all devices.
- Only the minimum data to be transmitted across the network for a given update since only changes in data are sent from clients to the Cognima Server or vice versa.
- A key part of the design was to not require times of modification to be kept for each property of an object on the client device as updating these on constrained client devices is slow and keeping a last modified time for each property in an object would take a lot of space.
- On the Cognima Server storing modification times for all properties of an object is fine as the server has enough storage space and processing power to deal with this.

5.2.2 Metadata

In order for the system to work it needs a clear idea of what properties are defined for a given class of objects. This is done by providing the programmer with a few C++ compiler macros that allow definition of the class metadata.

The definition of the properties to be used in a class result in a Class Metadata definition. This definition tells the CRE (Cognima recognition engine) what type a given property is and allows it to pack and unpack an object or a property for transmission over a data link. In order for the CRE system to work all clients and the server must have the same class metadata definition. Thus the following occurs:

- When a new Metadata definition is declared on a client device it is sent to the Cognima Server and from there the Cognima Server will send it to all other clients.
- When a new Metadata definition is declared on a Cognima Server the definition is sent to all client devices.
- When a new client device logs on to a Cognima Server for the first time all of the metadata definitions are sent to that device before any objects are sent.
- In all of the above cases a future optimisation may be made so that the Cognima Server only sends the metadata definition to clients who access the class (and the specific properties) the metadata refers to.

5.2.3 ChangeLog

The purpose of the ChangeLog is to record any changes that have occurred since the client device last connected to the Cognima Server (or the Cognima Server to the client device). Using Cognima APIs, applications connect to the CRE and can cause objects to be created or deleted, or a property in an object to be changed. These changes are added to a ChangeLog on the local device as they are made together with the time the change was made. Objects are given unique identifiers when they are created so that a given object can always be identified.

In the same way, creation and deletion of objects and changes to object properties by applications running on the Cognima Server result in the changes being added to all the Change-Logs of all the client devices registered to that user on the Cognima Server. The time of changes are recorded for each object or property.

ChangeLogs can be built in two ways:
- As the new objects are created and properties are changed (this is normally the case for client devices)
- Or they can be built on demand when they are needed by using the last modified times of objects and properties if these are stored on the system (in some circumstances, this method may be used on the Cognima Server instead of the above method).

5.2.4 Replication

When a client device has items in its ChangeLog to send it will connect to the Cognima Server (and likewise for the Cognima Server connecting to the client device). By default, the items in the ChangeLog are sent in the order in which they were added to the ChangeLog, however they may be reprioritised immediately before sending to provide for premium services, urgent data and so on. Items transferred are:

- A metadata definition including the type of each property of a given class of objects.
- A new object that has been created—with the contents of the properties of that object.
- A property has been changed—with the new value of the property.
- An object has been deleted.

In all the above cases the appropriate IDs are sent to identify the object, class and properties involved. All ChangeLog items are marked with the time the item was added to the ChangeLog. These times are always local machine times and are resolved into GMT by the Time Management approach described in Section 6.2.

When a client device receives ChangeLog items from a Cognima Server:
- When a client device receives a new object message from a Cognima Server it adds this new object to its local database.
- When a client device receives an object deletion message from a Cognima Server it marks the object as deleted in its local database.
- When a client device receives a property change it is always assumed that the Cognima Server is authoritative on the current state of the database and so the change is always made to the value of the property held in the local database.

A Cognima Server receives ChangeLog items from a client device:
- When a Cognima Server receives a new object from a client device it is added to the Cognima Server database and also added to all the Change-Logs of the client devices registered to that user, apart from the Change-Log of the machine that sent the new object in the first place.
- When a Cognima Server receives an object deletion from a client device the object is marked for deletion and an object deletion message is added to all the Change-Logs of the devices registered to that user apart from the Change-Log of the machine that sent the object deletion in the first place.
- When a Cognima Server receives a property change it compares the time of the change to the current time held for that property on the Cognima Server. If the time of the property change is later than that held on the Cognima Server the property value is changed in the server database and this change is also added all the ChangeLogs of the client devices registered to that user—including the one of the machine that sent in property change (in case another object update has been sent to that machine in the meantime). If the property change was not later than the one held on the Cognima Server no change is made as the stored property value is more recent—but the value is added to the list of old property values on the Cognima Server so that a user can retrieve it later if required. When times are compared the Time Management approach described in Section 6.2. below is used.

When a device first connects to a Cognima Server it will be sent all class metadata definitions and then all the objects in the database for that user. The Deletion messages generally just mark an Object for deletion. Actual removal of the object from the database may occur later on once all objects referring to that object have also been deleted.

5.2.5 Optimisations

An optimised version of the above replication protocol allows for aggregation of the entries in the ChangeLog. If a ChangeLog (in the Cognima Server or on a client device) has not yet been replicated, and a subsequent entry is added, then existing entries can be scanned to potentially reduce the number of entries that need to be replicated during the next connection:
 if the new entry is an update to a property that is already scheduled for update then only the later entry need be retained
 if the new entry is an object deletion then all property updates for that object can be removed from the ChangeLog
 if the new entry is an 'undelete' command and the original deletion is still in the ChangeLog then the two entries can both be removed from the ChangeLog 6. Core Algorithms 6.1 Handling Endian-Ness Operating systems are fundamentally little endian or big endian which is a choice of the byte order in which numbers and strings are stored. If two computers which have different endian-ness have to communicate then one of the computers will have to switch the endian-ness of its data packets. In the Cognima environment the Cognima client software uses the same endian-ness as the host client device. The Cognima Server has to determine the endian-ness of the client device (it uses a reference value in the first packet of data from the client) and then convert the subsequent incoming data if necessary to maintain consistent endian-ness in the Cognima Server. The Cognima Server also has to convert any outgoing data it sends back to the client device.

6.2 Synchronising System Times

Different devices will inevitably have slightly different system times. Changes that are sent from client devices to the Cognima Server are stamped with the device system time at the time of the change. It is up to the Cognima Server to resolve the times on different devices so that it can judge the order in which changes took place and record the correct update.

The logon of a device contains the current device time. The Cognima Server should be able to compensate for the latency of the network and compare the login time with its own system time. This will give it a delta between the device time and the Cognima Server time. This delta can be applied to further times sent up by the device in that session.

The Cognima Server can compare deltas in successive sessions from a device to determine clock 'creep' on the device or changes of time zone: it cannot be assumed that all the client devices in the system have clocks that are well synchronised to each other:
 Clock times drift on devices depending on the device's clock accuracy.
 Some users like to set clocks 5 minutes early for example.
 Some users will make changes to clocks to account for daylight saving rather than adjusting the locale settings (and some OSes may not provide locale features anyway forcing the user to change the clock directly).

To get round this problem, the server will be responsible for adjusting times used by the client device to GMT when comparisons are made on the Server, and from GMT to the equivalent time for the client device when messages are sent from the Cognima Server to the client device.

The client device will tag all the items in the ChangeLog with times obtained from the local clock—as far as the client device is concerned it only ever deals in time based on the client device's own clock.

Each time the client device connects to the Cognima Server it sends its view of the current time as given by the clock on the client device. From this the Server can work out:
 What the delta to GMT is
 If there has been any drift in the mobile device clock since the last time it logged on since the server keeps a record of the last delta to GMT and when the last connection was made and therefore can compare these. If there is drift the server can adjust all times sent by the mobile device pro-rata.

For example the table below shows a pattern of events with a client device connecting to a Cognima Server. The Client device's time is 5 minutes slower that the Cognima Server and is loosing a minute every hour (an extreme case to show the point). Also to show the point we will assume that from 09:00 to 12:00 the user is on a plane and out of contact with the Cognima Server so it does not connect during this time:

| Action | Client Device Time | Cognima Server time (GMT) |
| --- | --- | --- |
| Client device connects to Cognima Server | 09:00 | 09:05 |
| A change is made to property A | 10:00 | X |
| A change is made to property B | 11:00 | Y |
| Client device connects to Cognima Server | 12:00 | 12:08 |

In order to work out if the property changes were made before or after the time stored on the Cognima Server the times X and Y need to be worked out. From the information above the Cognima Server knows that when the client last connected it was around 3 hours ago and at that point the time difference was 5 minutes whereas now it is 8 minutes. Thus, assuming the clock drift happens linearly, the Cognima Server can work out that the device is 5 minutes behind GMT and that the clock is drifting back a minute every hour.

From this is it possible to work out that the time the client device knows as 10:00 for the property A change needs to have 5 minutes added to it for the initial drift, plus one minute for the extra drift that occurred in the hour till that property was changed.

Likewise Property B needs to be adjusted to 11:07—the 5 minutes initial drift plus 2 minutes since two hours elapsed from 09:00 to 11:00 when the property was changed.

In practice the delta to the time between the client device time and GMT may be minutes, but the drift will be in the order of fractions of seconds per hour.

6.2.1 Time Adjustments

As well as the delta to GMT and any drift in the client device clock, users can also change the time on the client device. They may do this to reset the time to the correct local time (we can give the user the option to have this happen automatically but some users may want to keep their own control of their client device time—e.g. they like to have the clock set 5 minutes fast). They may also make adjustments to reflect a change of local time (i.e. daylight savings or changing timezone). The goal is that the user can change the clock on the device to any time that suits the user and the device simply takes account of this.

When the user makes a change to the client device time most operating systems will report this change (for systems that don't do this the time can be polled say every minute to check for such a change). On detecting a change in time the client device will work out the delta between the new time and the time as it was before the change. For example this may be a change of plus one hour as a user moves timezone. The client device stores this time difference as the Adjust Time which it saves for the next connection to the Cognima Server. The client device also goes through every entry in the ChangeLog and updates all times in the log by Adjust Time. This ensures that the entries in the ChangeLog are always relative to the local time on the client device.

Several such adjustments could be made between connections to the Cognima Server—each time the amount of the time change is summed with the Adjust Time and the ChangeLog updated so that the times in the log are all relative to the local time on the client device.

When the client device next connects to the Cognima Server the client device sends at logon the stored Adjust Time—i.e. the amount by which the client device clock has been adjusted backwards or forwards since the last connection. The Cognima Server can then remove this amount from the time from the delta to GMT and drift calculation.

6.2.2 GMT to Client Device

The same set of calculations can be made in reverse to convert the GMT times of changes made on the Cognima Server to the correct local time for a given client device.

6.3 Adding an Application

An application will use one or more classes to hold user data. The definition of the class is hard coded into the application. The version of the class is coordinated by releases of the application.

Say that a statistics application uses a Footballer class to hold data about footballers. When the application starts on a client device for the first time, it inquires from the device what version of the Footballer class the device already holds. If the version on the device is the same as the version that the application has been hard coded to use then nothing more need be done.

If the device holds a newer version of the Footballer class, then the application needs to be robust enough to cope with more properties than it expected. (This situation would arise if you had a class being used by multiple apps and for some reason you installed an older version of one of the apps. This should be rare: ideally interdependent apps should be upgraded together.)

If the device holds an older version of the Footballer class (or no version at all) then the application's version of the Footballer class should replace it. The new version is sent up to the Cognima Server. The Cognima Server therefore maintains a list of versions of classes used on all devices.

The web portal pages will be the equivalent of the hard-coded device application. The web can extract objects from the database according to the latest version of the class, and if there are more properties than it was hard coded to expect it can ignore them. Therefore the web does not need to declare class versions.

6.4 Change-Log Optimisation

The Cognima Server maintains Change-Logs for all devices listing changes that will be sent to the devices when the devices next connect. There will be optimisations that can be made to the Change-Logs, for example:

- If >2 updates to the same property are queued in the Change-Log then only the last need be kept.
- If a deletion is queued for an object then any updates ahead in the queue may be removed.
- If an update is queued for an object then any delete ahead in the queue should be removed.
- If a device registers a new application there could potentially be very many objects to send down to it (e.g. message history). The Change-Log should only have a sensible number of objects added to it (e.g. the 20 most recent messages).

7. Ghosting, Resurrection, Pinning and Withdrawal

The space available on a client device to hold user data will typically be orders of magnitude less than the space available on the server. The device needs to hold a subset of data and the user should have to do as little work as possible to maintain this subset. Ghosting and withdrawal are tools to aid this.

A class definition may include flagging certain properties as 'ghostable'. This means that if the object is ghosted those properties will be nulled, freeing room on the client device. Ghosting is done automatically on the device. The decision about which objects to ghost is made by following a 'ghosting rule' and applying the rule whenever an object is created or updated. The rule defines the maximum number of a selection of objects. When the maximum is exceeded the objects in the selection at the bottom of a sort order are ghosted.

For example, the class might be messages, the selection might be messages in the inbox, the sort order might be by date/time and the maximum number might be 50. If there are 50 messages in the inbox and a new message arrives, the oldest message in the inbox is ghosted. Ghosting may remove the message body but leave enough header information for the message to be recognised.

Withdrawal (also known in the past as auto-deletion and removal) is similar to ghosting but works by removing the entire object, not just part of it.

Neither ghosting nor withdrawal are notified to the Cognima Server. They are purely local to the client device. Therefore different devices may have different numbers of objects. The data on the devices is still fundamentally in sync, but the devices hold different data subsets.

If the user wants to resurrect a ghost then a request is passed from the client to the Cognima Server for the object to be resurrected. A refresh of the object is sent down to the device and the object is put back to normal.

Individual objects can be pinned. A pinned object is never ghosted or removed. Pinning can be chosen by the user, or it can happen automatically. For example, an object that is resurrected is automatically pinned.

8. User Replication—Sharing Objects

There are many applications for which we envisage it will be useful for users to be able to share objects. The general way that this will work is: A user needs to know the Cognima address of users that he may want to share objects with. It is more appropriate to discuss the retrieval of these addresses in detail in the Cognima Server architecture. Here we assume that such a list is available.

A set of one or more Cognima addresses is attached to the object which is to be shared. The object can be set to read-only (so the people you share it with cannot modify it). When the Cognima Server receives the new object (or receives an update to it) from the web or a client device it replicates it as normal.

It also looks up the list of 'sharees' Cognima addresses. It marks the object with an originator id (i.e. the Cognima address of the object owner+the object id) and sends it to the sharees. The sharee users may exist on the same Cognima Server or be on different Cognima Servers. The Cognima Server of the sharee receives the object. If it is a new object it assigns a new object id keeping note of the originator id). If it is an update it finds the object using the originator id.

If the sharee is allowed to update the object, the update can be replicated back to the object owner using the originator id.

9. Displaying Data

Conventional small devices like PDA tend to have simple filing systems that allow applications to read and write data to some kind of storage that will keep the data when the application is not running. Generally these programs will tend to read in the available set of data and then provide a user interface to display the data on the screen. This has some disadvantages:

Reading in the data when the program starts takes time

The application needs to store all or some of the data in memory meaning it is now occupying more memory on the client device Allowing more than one application to access the same set of data becomes non-trivial Similar code to read and manipulate the data appears in several applications that run on the device.

The Cognima approach is different:

Data is stored in an Object Database that can be accessed by several applications A Cognima application does not read in all the data it deals with from a database. Instead it creates a selection—a subset of the data which it is currently interested in. In general this selection matches the data that is currently being displayed on the devices screen. Thus only the data currently being used by the application is held in memory—saving a lot of memory space.

All of the work of storing, sorting and indexing the data is done by the Object Database and so this functionality does not need to be repeated in each application.

When changes need to be made to data in an application, the application never directly updates its own display of the data. Changes will update the properties in an object or create or delete an object. A change to the data could be made by another application or an update received from a Cognima Server due to the data being changed on another machine.

When an application sets up a selection it gives a list of criteria by which data is either included or excluded from the selection—because of this the Cognima Replication Engine can tell which applications to notify when an object is created, deleted or updated.

When an update needs to be sent to the application, code in the application linked to the selection that contains this data is called and in this way the application can respond to the changes that have been made.

When selections are set up, the application can also specify how the data is sorted and if only a small window on the sorted list of data is required known as a view).

This approach is similar to the screen re-paint approach used to redraw graphics screens on Windowing systems. When an area of the screen needs repainting the application that is responsible for that bit of screen is called to repaint the screen.

9.1 Example

A client device may have a contacts application running on it—this device replicates data with a Cognima Server connected to other client devices also running contacts applications. A class of object is defined for a Contact that contains names and phone numbers and these are replicated to all the devices of a given user.

An application on one device may have a display that shows all contacts by beginning letter—for example the interface allows the user to press a D button to show all the names beginning with D. This application will set up a selection that contains objects:

Where the class is defined as Contacts

Where the name begins with the selected letter (e.g. D)

When the selection is defined the application also defines code to be called by the CRE when objects are added, deleted or updated.

When the selection is first set up this code will be called back with the first set of objects that fulfil the above criteria.

If the application was asked to create a new contact with a name beginning with D the application would create the object but do nothing else. The CRE would detect the new object and call back the selection code to notify it of the new object.

Likewise is a new Contact object was created on another device and was replicated to the client device—if the name of that Contact began with D the application would be notified.

9.2 Sorting

Data in selections generally needs to be sorted—often so that when displayed users can see data in a logical format. When a selection is defined the sorting order can be specified: the properties to sort on, in what order and what sorting algorithms to use.

9.3 Views

There may be many items of data in a selection. Commonly when the data is being displayed it may not all fit on the screen and so the user will need to scroll up and down the data. A view provides this functionality by specifying the number of items of data the selection wants to deal with and the number of the first item of data out of the complete list of data the application wants to appear in the selection.

Views are important because they allow an application to limit the amount of data it stores locally to be limited to just the amount needed to display on the screen this reducing unnecessary duplication of data.

9.4 Efficiency

Cognima has made some efficiency optimisations in how the data is transferred between the Cognima server and client application—when multiple data changes are made the data is sent in blocks and then the application informed that the changes are complete so that the application only needs to update its user interface once.

9.5 Example

As an example we will define a selection called Contact-Selection. This is the code that the framework will call back whenever a change is made to any of the selected objects. In the Cognima framework this is implemented as an object which you derive from the COdbSelect templated class—specifying the type of object you want to have in the selection as the template argument.

```
class CContactSelect : public COdbSelect<CContact>
{
public:
    CContactSelect(COdb *aOdb);
    void ObjectAdded(CContact *aObject);
    void ObjectUpdated(CContact *aObject);
    void ObjectRemoved(const TOdbObjectId aObjectId);
private:
    bool ListContacts( );
};
```

The methods ObjectAdded(), ObjectUpdated() and ObjectRemoved() are called by the framework whenever respectively an object is added, updated or removed. When you implement the Selection class you don't need to implement all these methods if you do not want to take instance action on any of these events—in some cases you may set up a selection to keep a list of a certain set of objects but only check that list on some other event and so the above methods would not be required.

We have defined one extra private method called ListContacts()—this will list all the current contacts held by the selection.

Here is the implementation of this class:

```
CContactSelect::CContactSelect(COdb *aOdb)
: COdbSelect<CContact>(aOdb)
{
}
void CContactSelect::ObjectAdded(CTestContact *aContact)
{
    OdbLog(OdbLogApp,L"New contact added: "
        << aContact->GetName( ));
    ListContacts( );
}
void CContactSelect::ObjectUpdated(CTestContact *aContact)
{
    OdbLog(OdbLogApp,L"Contact updated: "
        << aContact->GetName( ));
    ListContacts( );
}
void CContactSelect::ObjectRemoved(const TOdbObjectId aObjectId)
{
    OdbLog(OdbLogApp,L"Contact deleted - Id: " << aObjectId);
    ListContacts( );
}
void CContactSelect::ListContacts( )
{
    OdbLog(OdbLogApp,L"Contacts list:");
    for (unsigned long Index=0; Index<iResult.size( ); Index++)
    {
        CTestContact *Contact=iResult[Index];
        OdbLog(OdbLogApp,Contact->GetName( ) << ","
            << Contact->GetPhone( ) << ","
            << Contact->GetEmail( ));
    }
}
```

The constructor simply calls the default COdbSelect constructor. The ObjectAdded(), Updated() and Removed() methods print out what change was made and then call ListContacts() to show what the current contents of the list is.

The ListContacts() shows how the current list of object held by the selection can be accessed. The current list of pointers to objects is held in a container class called iResult—this can then be accessed by normal container class integrators. In this case we simply go through the list and print all the objects in the list.

The invention claimed is:

1. A method of power management in a data replication process deployed in a wireless information device, in which the device automatically sends predefined types of data held on the device to a remote server over a wireless network; the method comprising a processor:
   (a) automatically determining the battery level of the device;
   (b) not sending data over the wireless network if the battery level is below a first threshold;
      wherein, if the battery level is above the first threshold but below a second threshold, then the step of automatically sending comprises only sending data of a size that can be sent without consuming a predefined amount of power.

2. The method of claim 1 in which, if the battery level is above a second threshold, then all data is sent.

3. The method of claim 2 in which, the battery level is monitored whilst data is being sent such that, if the battery level falls below the second threshold, then the device automatically ceases sending data.

4. A wireless information device programmed with an application that can perform the method of claim 3.

5. The method of claim 2 in which either or both of the thresholds can be set remotely.

6. A wireless information device programmed with an application that can perform the method of claim 5.

7. The method of claim 2 in which the data size can be set remotely.

8. A wireless information device programmed with an application that can perform the method of claim 7.

9. The method of claim 7 in which the threshold or data size is set remotely for a given class of device.

10. A wireless information device programmed with an application that can perform the method of claim 9.

11. The method of claim 7 in which the threshold or data size is set remotely for a given end-user.

12. A wireless information device programmed with an application that can perform the method of claim 11.

13. The method of claim 9 in which the threshold or data size is set remotely for a given end-user.

14. A wireless information device programmed with an application that can perform the method of claim 13.

15. A wireless information device programmed with an application that can perform the method of claim 2.

16. The method of claim 1 in which data that cannot be sent because doing so would consume in excess of the predefined amount of power, is queued for delivery when the device has sufficient battery power.

17. A wireless information device programmed with an application that can perform the method of claim 16.

18. The method of claim 1 in which the first threshold is set at a level sufficient to preserve sufficient battery power for at least emergency calls.

19. A wireless information device programmed with an application that can perform the method of claim 18.

20. A wireless information device programmed with an application that can perform the method of claim 1.

* * * * *